(12) United States Patent
Cheynet de Beaupre

(10) Patent No.: US 9,446,863 B2
(45) Date of Patent: Sep. 20, 2016

(54) SATELLITE HAVING A SIMPLIFIED, STREAMLINED, AND ECONOMICAL STRUCTURE, AND METHOD FOR IMPLEMENTING SAME

(75) Inventor: Rene Cheynet de Beaupre, Castanet-Tolosan (FR)

(73) Assignee: Airbus Defence and Space SAS, Les Mureaux (FR)

( * ) Notice: Subject to any disclaimer, the term of this patent is extended or adjusted under 35 U.S.C. 154(b) by 440 days.

(21) Appl. No.: 13/642,694

(22) PCT Filed: Apr. 19, 2011

(86) PCT No.: PCT/FR2011/050899
§ 371 (c)(1),
(2), (4) Date: Jan. 7, 2013

(87) PCT Pub. No.: WO2011/135230
PCT Pub. Date: Nov. 3, 2011

(65) Prior Publication Data
US 2013/0099059 A1    Apr. 25, 2013

(30) Foreign Application Priority Data

Apr. 28, 2010    (FR) ...................... 10 53255

(51) Int. Cl.
*B64G 1/64*    (2006.01)
*B64G 1/10*    (2006.01)
(52) U.S. Cl.
CPC ................. *B64G 1/641* (2013.01); *B64G 1/10* (2013.01); *B64G 2001/1092* (2013.01)

(58) Field of Classification Search
CPC . B64G 1/641; B64G 1/10; B64G 2001/1092
See application file for complete search history.

(56) References Cited

U.S. PATENT DOCUMENTS

| | | | |
|---|---|---|---|
| 5,755,406 A * | 5/1998 | Aston et al. | 244/159.4 |
| 6,206,327 B1 * | 3/2001 | Benedetti et al. | 244/159.4 |
| 6,726,151 B2 * | 4/2004 | Hebert | 244/159.4 |

FOREIGN PATENT DOCUMENTS

| | | | |
|---|---|---|---|
| FR | 2 372 083 | 6/1978 | |
| GB | 1 557 500 | 12/1979 | |
| GB | 2 270 666 A | 3/1994 | |
| GB | 2270665 A * | 3/1994 | ............. B64G 1/641 |

OTHER PUBLICATIONS

French Preliminary Search Report for FR 1053255, dated Nov. 17, 2010 (2 pgs.).
International Preliminary Search Report for PCT/FR2011/050899, dated Aug. 4, 2011 (2 pgs.).

* cited by examiner

*Primary Examiner* — Valentina Xavier
(74) *Attorney, Agent, or Firm* — Patterson Thuente Pedersen, P.A.

(57) ABSTRACT

The invention relates to a satellite having a structure that includes a circular launching interface ring and at least two main planar apparatus-holding walls that are substantially parallel to the axis of the ring and rigidly connected to one another and to the ring. Each wall directly bears on the ring by a base of the wall, and each wall is rigidly and directly attached to the ring by at least one somewhat point-by-point connection on at least one point or area of tangency or intersection with the base of the wall and the ring.

12 Claims, 13 Drawing Sheets

PRIOR ART

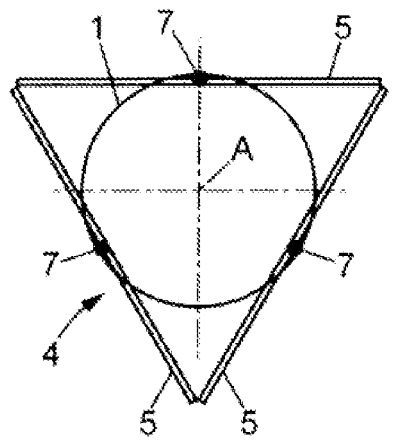
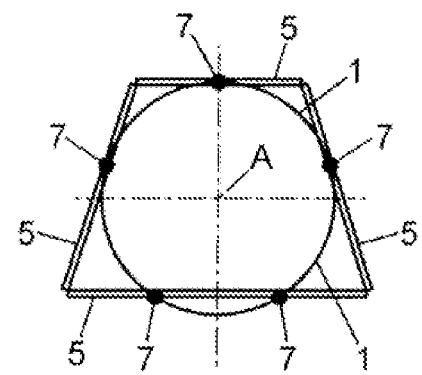
FIG. 3a
FIG. 3b
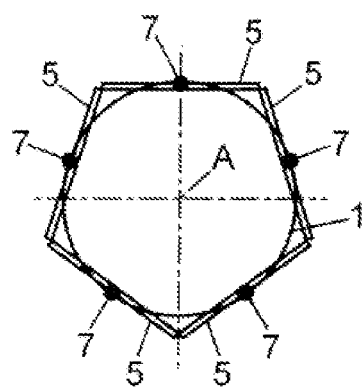
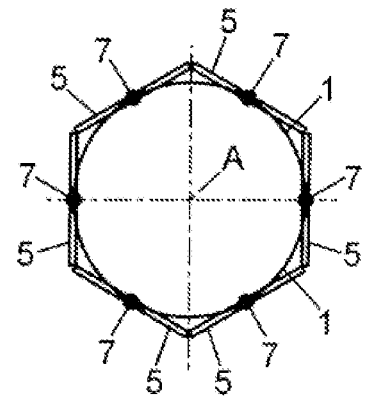
FIG. 3c
FIG. 3d
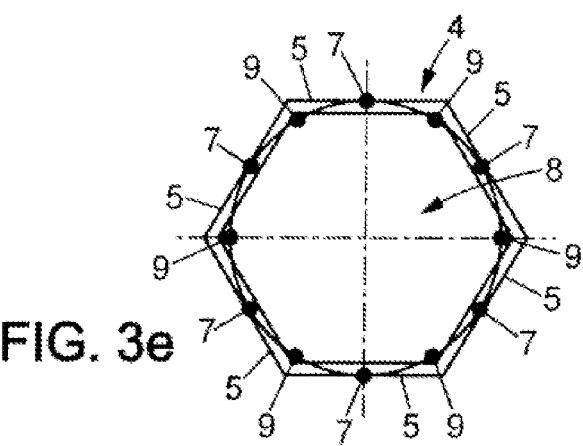
FIG. 3e

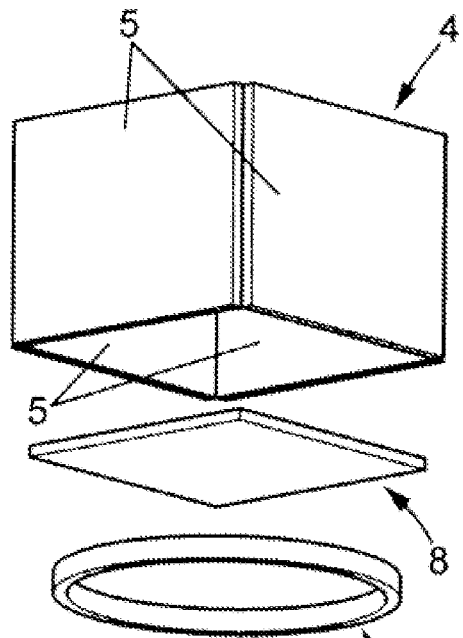
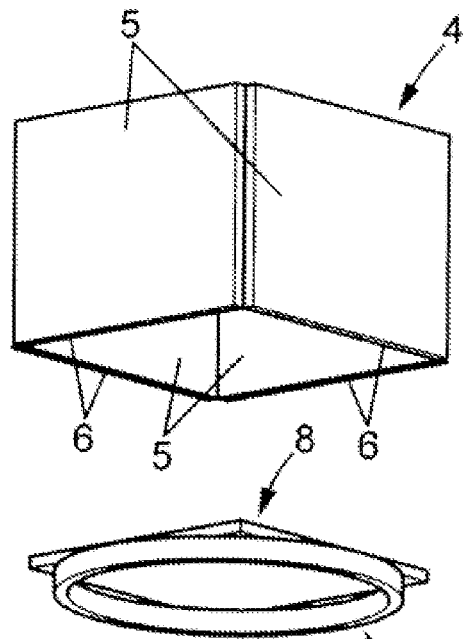
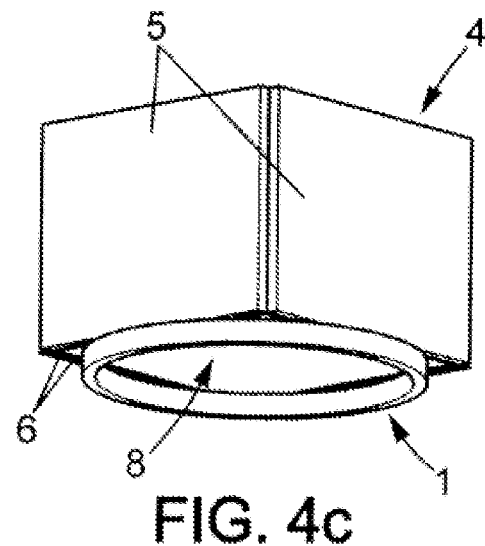
FIG. 4a
FIG. 4b
FIG. 4c

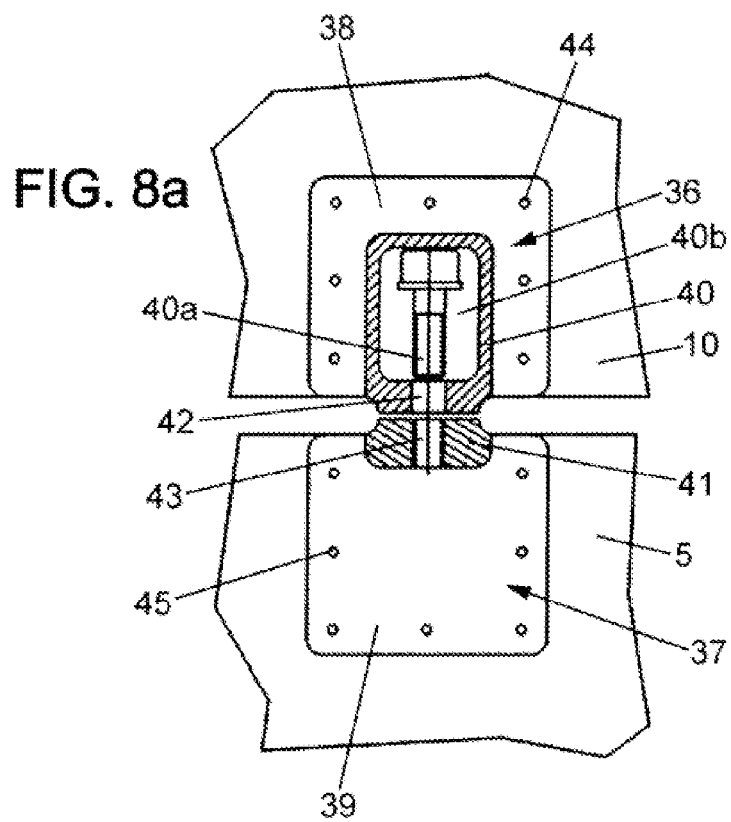
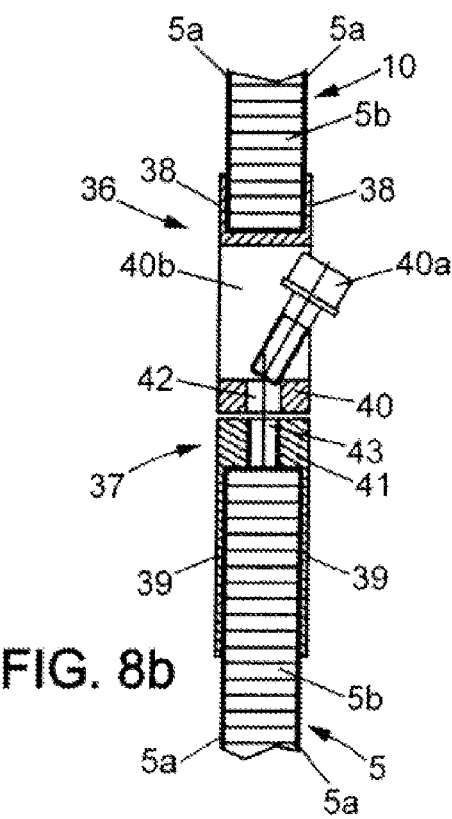

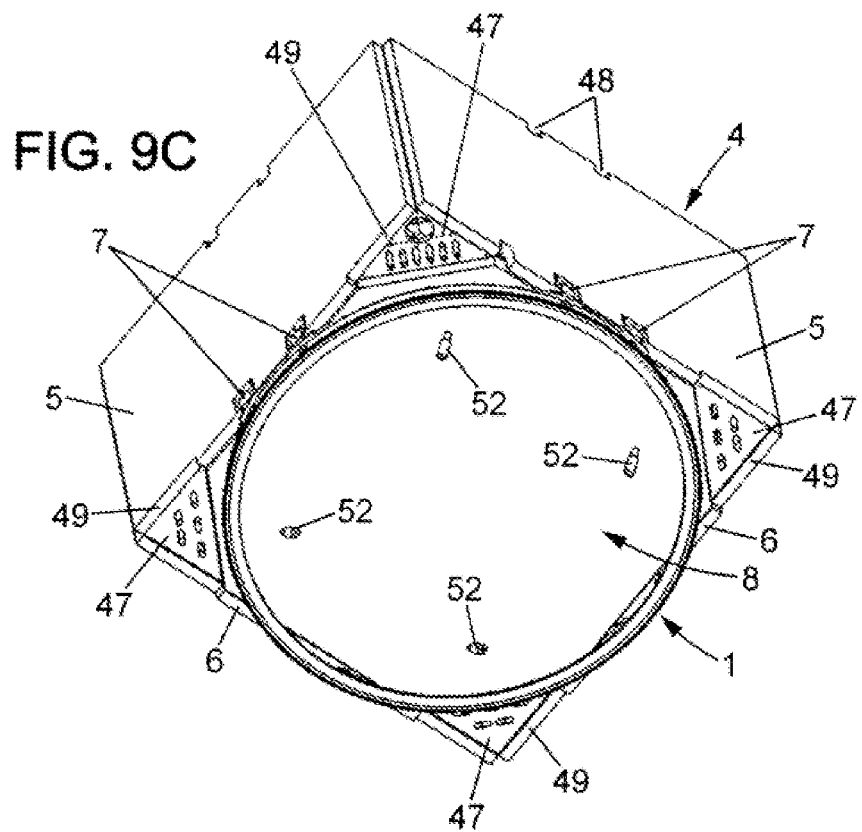
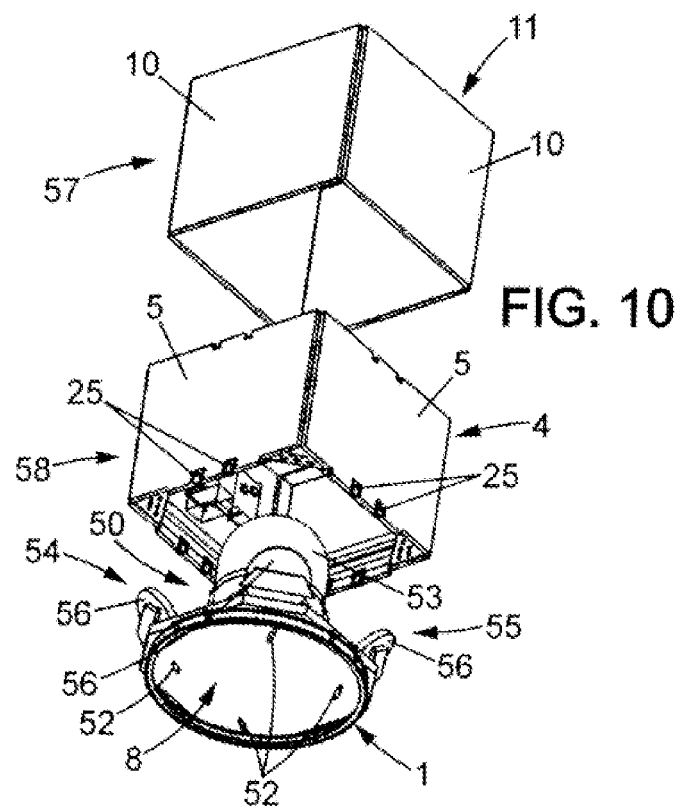

SATELLITE HAVING A SIMPLIFIED, STREAMLINED, AND ECONOMICAL STRUCTURE, AND METHOD FOR IMPLEMENTING SAME

PRIORITY CLAIM

The present application is a National Phase entry of PCT Application No. PCT/FR2011/050899, filed Apr. 19, 2011, which claims priority from French Application Number 10 53255, filed Apr. 28, 2010, the disclosures of which are hereby incorporated by reference herein in their entirety.

FIELD OF THE INVENTION

The invention relates to the technical field of man-made satellites, and more specifically to their structures.

BACKGROUND OF THE INVENTION

The invention generally concerns a satellite in which the structure comprises:
- a circular launcher interface ring, intended to be removably secured to an analogous ring secured to a satellite launcher, and freed from the ring secured to the launcher when the satellite is released from the launcher at the end of the launcher's propulsion phase, and
- at least two planar equipment-holding walls, extending substantially parallel to the axis of said launcher interface ring and rigidly connected to each other and to said interface ring.

In this structure, the axis of said ring, as with any circular ring, is understood to be the geometric axis perpendicular to the plane of the circular ring and passing through the center of said circular ring.

For a satellite to be compatible with multiple launchers, it is known that the launcher interface ring of the satellite, as well as the ring secured to the launcher and to which the launcher interface ring of the satellite is removably secured for the launch, are chosen with the same diameter, preferably from among three standard diameters which are respectively 937 mm, 1194 mm, and 1666 mm. The satellite structures must be both very light (typically from 20 to 25% of the total mass of the satellite at launch) and be resistant to launch stresses by withstanding several Gs of static acceleration (where G is the acceleration due to the Earth's gravity). In the current art, they also comprise an intermediate support structure, supporting the planar equipment-holding walls and connecting them to the launcher interface ring.

This intermediate support structure is a large structure which, as represented in the attached FIG. 1a, may be a single part 3a, generally cone-shaped or of a similar tapering shape, for example with a cross-section perpendicular to the axis of the launcher interface ring 1 that changes from a circular shape at its connection to said launcher interface ring 1, to a square or rectangular shape at its connection to the four walls forming a cubic 2a or parallelepipedic compartment for the satellite equipment, or a bowl-shaped structure 3b (see FIG. 1b), possibly with an inner chimney, having facets of a number and position corresponding to the exterior walls of the compartment 2b for the equipment and/or payload of the satellite. As a variant, as represented in FIGS. 1c and 1d, this intermediate structure 3c or 3d may consist of several assembled parts and comprise panels and/or at least one cone and/or at least one cylinder, supporting a compartment 2c or 2d.

This intermediate support structure takes all the static forces at launch and passes them to the equipment-holding walls which are attached to this structure.

In addition, the propulsion sub-assembly of the satellite, which is a very massive portion of the satellite and represents up to half the total weight of the satellite at launch, is generally also directly mounted onto this intermediate support structure.

In patent document GB 2 270 666, an example of such an intermediate support structure of a satellite is represented in FIGS. 2a-2c et 3a-3d, and described from page 7 line 28 to page 10 line 15 with reference to these figures, in which this intermediate structure is denoted by the reference 15 and is secured to the launcher interface ring 14.

A variant of the prior art illustrated in the previously described FIG. 1d is known from FR 2 372 083 (or GB 1 557 500). In this variant, the connecting elements 1, 21 and 51 of FIGS. 2, 7 and 8 of GB 1 557 500, ensuring the connection between the load-carrying structure of the satellite and the launch vehicle, are cylindro-conical intermediate support structures of the same type and substantially the same shape as the connecting element 15 or intermediate support structure of FIG. 2c of GB 2 270 666, presented above as prior art.

In fact, GB 1 557 500 relates to a load-carrying structure for a man-made satellite which comprises a connecting element for connecting said structure to a launch vehicle, a central rigid connecting structure attached to this connecting element and extending along the axis of the load-carrying structure, and a certain number of support platforms, for carrying equipment that is at least part of the satellite payload, that are attached to the central connecting structure.

The primary goal of the central connecting structure is to pass on to the support platforms the acceleration forces which develop during launch, while ensuring that the geometry of the entire system remains strictly unchanged.

The subject-matter of GB 1 557 500 is therefore an intermediate support structure arranged as a central connecting structure with a circular launcher interface ring, this central connecting structure being functionally analogous to the intermediate support structure 3d of FIG. 1d of the prior art described above.

Such an intermediate support structure, according to GB 2 270 666 or GB 1 557 500, or according to any one of FIGS. 1a to 1d described above, and known from the prior art, results in added mass as well as additional design and production costs. In addition, such an intermediate support structure is generally neither generic, in that it cannot be used for satellites of different types, nor modular, and must be redeveloped specifically for each new type of satellite which results in added development costs.

SUMMARY OF THE INVENTION

The goal of the invention is to propose a satellite of lighter structure and simplified architecture, that is therefore more economical to produce than known satellite structures of the prior art, and which is generic in the sense that the architecture of the proposed structure allows covering an entire range of structures and adapting to satellites of very different sizes, for example from 900 to 1700 mm wide, 800 to 3000 mm long, and weighing 300 to 2000 kg, as well as having structures of different geometries, by using a limited number of base components.

For this purpose, the satellite of the invention, having a structure of the type defined above and comprising a circular launcher interface ring and at least two primary walls substantially parallel to the axis of said ring and rigidly connected together and to said ring, is characterized by each primary wall bearing directly on said interface ring by a base of said wall, said base facing said interface ring, and each primary wall is rigidly and directly attached to said interface ring by at least one somewhat point-by-point connection to at least one point or area of tangency or of intersection between said base of said wall and said interface ring.

Because the primary equipment-holding walls directly bear on the launcher interface ring, these walls, composed in a known manner and preferably of honeycomb panels, become shear walls. As they press directly on the ring, this eliminates any intermediate support structure of the type presented above, and therefore an additional advantage is that this is a source of flexibility.

Thus the elimination of the intermediate support structure not only saves weight and costs, by improving the simplicity of the structure architecture, but simultaneously improves the modularity, adaptability, integrability, and testability of this architecture and of the equipment modules for which this architecture facilitates the integration, particularly if the structure also applies at least one of the technical measures presented below.

The structure of the invention may only have two primary walls, which are then rigidly braced or intersecting, but preferably the satellite structure of the invention comprises at least three planar walls rigidly attached and adjacent two by two to form a prismatic compartment, having an axis substantially parallel to the axis of said interface ring and having a cross-section, perpendicular to said axis of said ring, that is polygonal and preferably triangular, square or rectangular, trapezoidal, pentagonal, or hexagonal in shape, without being limited to this list.

Advantageously, the structure of the satellite also comprises an equipment-holding platform arranged between said walls without any contact with them, and directly bearing on said interface ring, to which said platform is rigidly and directly attached so as to be planar, independently of the attachment of said walls to said interface ring.

Also advantageously, this equipment-holding platform is attached to the interface ring by connections that are also somewhat point-by-point or linear, on arcs of the interface ring left free by the attachments between the primary walls and said ring. Thus the various equipment mounted on this platform do not interfere with the other equipment mounted on the primary walls, as the latter are supported directly on the launcher interface ring.

Advantageously, said platform supports a propulsion sub-assembly and/or a sub-assembly for the piloting and orbit and/or attitude control of the satellite, such that said platform, with the equipment it supports and said launcher interface ring to which said platform is connected, constitutes a module for the propulsion and/or the control of the orbit and/or attitude of the satellite, of which the coupling with a module, for example a service module, formed by the primary walls and the equipment they hold, is reduced to only the somewhat point-by-point connections between the primary walls and the launcher interface ring.

Advantageously, the satellite structure also comprises other planar walls referred to as secondary walls, substantially parallel or perpendicular to the primary walls, rigidly attached to each other and/or to the primary walls to form new compartments and increase the surface area and volume available to house equipment.

With the same goal of increasing the surface area and volume available to house equipment, as well as to offer specialized volumes for this purpose, the structure of the satellite advantageously also comprises other planar walls, substantially parallel to the axis of said interface ring, rigidly attached to each other and each one attached by its base to an end of one of said primary walls, said end facing away from said interface ring, such that said other walls form a compartment, for example a payload compartment or an extension of the service compartment, that is preferably prismatic with its axis parallel to the axis of said interface ring, and said other walls being attached by somewhat point-by-point connections above said primary walls.

One can see that the payload compartment and the equipment it encloses constitute a payload module, that the service compartment and the equipment it contains constitute a service module, and that the platform with the propulsion sub-assembly and/or the piloting and orbit and/or attitude control sub-assembly of the satellite attached to the launcher interface ring constitute a third module, and these three modules can be integrated then tested separately, the coupling between modules being reduced to said somewhat point-by-point connections, with a service module which can be directly supported on the launcher interface ring without interfering with the platform of the propulsion and/or piloting and orbit and/or attitude control module of the satellite.

In addition, the structure of the satellite allows the end of the primary walls which faces away from said launcher interface ring to be attached directly, by at least one somewhat point-by-point connection per primary wall, to a circular satellite interface ring, preferably of the same diameter as said launcher interface ring, which is itself intended to be removably secured to a second satellite interface ring of another satellite, preferably of a structure analogous to the satellite of the invention, and stackable onto the latter for a group launch.

Thus the structure of the satellite of the invention allows structures that can be superimposed for launching twin satellites, and more generally for multiple launches in order to form satellite constellations or clusters.

In order to further improve the dissociation and isolation from vibrations, particularly between the primary walls and the equipment-holding platform housed between them, or between the walls of a payload module and the walls of a service module, or between the launcher and the satellite, at least one somewhat point-by-point connection attaching said launcher interface ring or satellite interface ring, as applicable, to a wall or to a platform for holding equipment or for stiffening and/or for payload support comprises or is at least associated with a shock and/or vibration isolator (or damper).

In addition, the satellite advantageously has a structure such that the assembly consisting of said platform attached to the launcher interface ring, forms a module that can be removed without disassembling any other part of the satellite. The disassembly of said assembly allows opening up the satellite to perform actions inside, particularly by at least one operator during the integration or testing of a service module and/or a payload module.

The invention also relates to a method for implementing the satellite, made possible due to the specific structure of the satellite, wherein at least one compartment of primary walls is assembled without attaching it to the launcher interface ring, and the equipment-holding platform is assembled to said ring as an assembly forming a removable module without attaching it to said compartment; equipment is integrated into said at least one compartment and onto said removable module, then testing and certification is conducted on said at least one compartment, now equipped, and said removable module, now equipped, and at least one of the operations of integration, testing, and certification is performed separately on said at least one compartment and said removable module.

If the satellite comprises several equipment compartments, it is understood that it is also possible to assemble, and/or integrate equipment, and/or test, and/or certify each one independently and separately from the other compartment or compartments of the satellite.

For this purpose, advantageously, the operation of integrating equipment into at least one compartment of primary walls is performed through the opening at the base of said compartment, before assembly or after disassembly of said removable module onto/from said compartment, without disassembly of any other equipment-holding wall or panel.

In addition, when the method is implemented in a satellite in which the equipment-holding platform of the removable module is equipped with a propulsion sub-assembly comprising at least one tank of propellant, forming a propulsion module, advantageously said at least one tank is filled with propellant and/or emptied of the propellant that it contains respectively before assembly and/or after disassembly of the propulsion module and of said at least one equipped compartment and, preferably, of the rest of the satellite.

BRIEF DESCRIPTION OF THE DRAWINGS

Other features and advantages of the invention will be apparent from the following description of some non-limiting example embodiments, described with reference to the attached drawings in which:

FIGS. 3a to 3e are views analogous to FIG. 2b for other satellite variants according to the invention, with different shapes for the polygon of the transverse cross-section of the satellite, FIG. 3e being a variant of the hexagonal embodiment of FIG. 3d;

FIGS. 4a to 4c are three schematic perspective views representing three steps in the assembly of the structure of a satellite according to FIG. 2a and 2b or 2c;

FIG. 8a is a schematic view, part of it showing a side elevation and part of it showing a cross-section along a midplane parallel to the walls, of an example fitting connecting two superimposed walls to achieve the satellite structure according to FIG. 5a for example;

FIG. 8b is a partial view of the connection in FIG. 8a, showing the cross-section in a plane perpendicular to the plane of FIG. 8a and passing through the axis of the connecting screw;

FIGS. 9a, 9b and 9c are three schematic perspective views, more or less corresponding to FIGS. 4a, 4b and 4c respectively, and representing three steps in the assembly of the structure of a satellite of the invention, in order to achieve configurations analogous to those of FIGS. 5a to 5c, or two satellites stacked as shown in FIG. 5e;

FIG. 10 is a diagram showing an exploded perspective view of a satellite of the invention with three modules: a propulsion module at the bottom of the figure, a service module in the middle of the figure, and a payload module at the top of the figure;

DETAILED DESCRIPTION OF THE DRAWINGS

In the following description, the same numeric or alphanumeric references are used to designate components that are the same or analogous in the various figures.

Figure 1A:
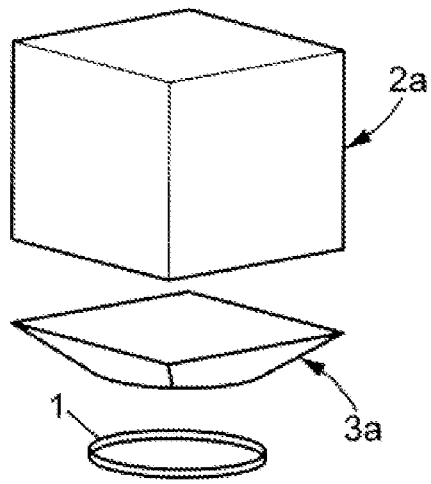
FIGS. 1a to 1d, already described above, are diagrams of exploded perspective views of satellites showing examples of intermediate support structures of the prior art.
Figure 1B:
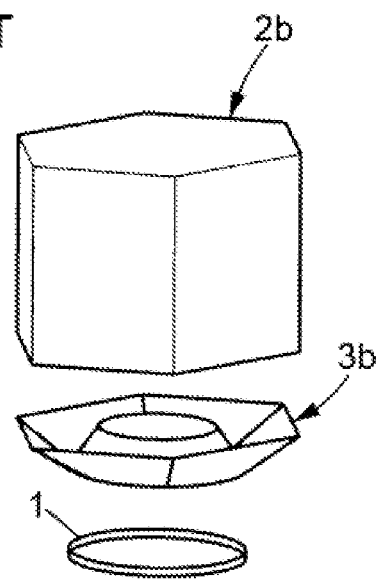
Figure 1C:
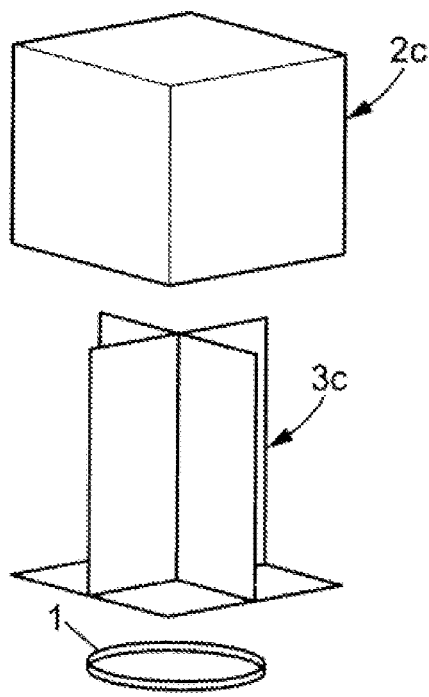
Figure 1D:
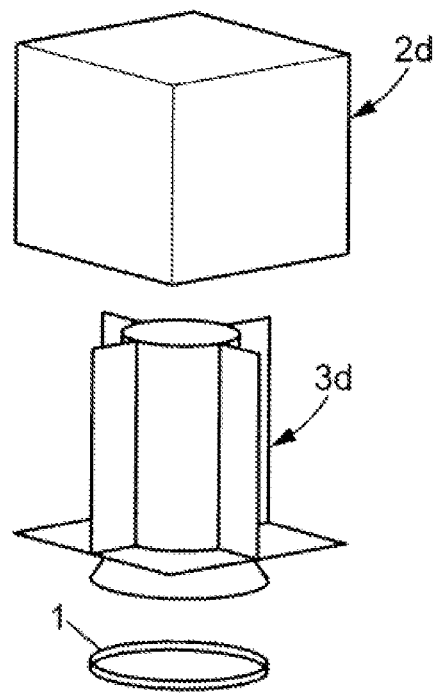
Figure 2A:
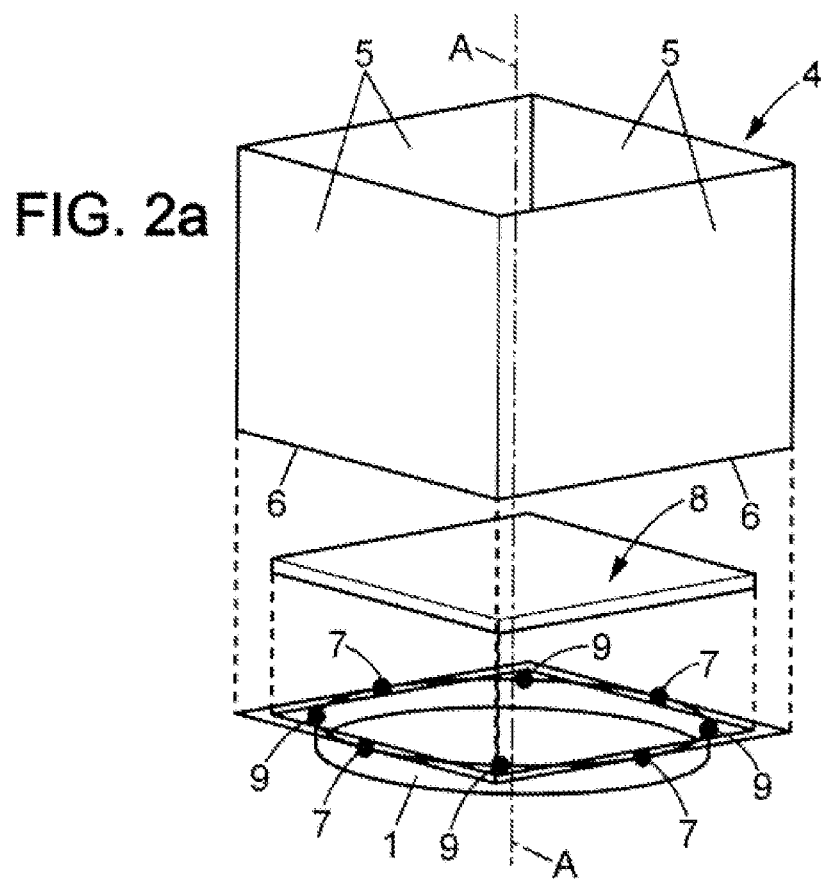
FIGS. 2a and 2b are schematic views, respectively showing an exploded perspective and a top view of a first example of a satellite structure of the invention.

FIG. 2a represents a circular launcher interface ring 1, having one of three standard diameters, such as the one in FIGS. 1a to 1d of the prior art, and onto which is directly attached a compartment for equipment 4, in this example in the shape of a rectangular parallelepiped (more specifically having a square cross-section), formed by rigidly interconnecting four planar equipment-holding walls 5, adjacent two by two along their lateral edges, each one parallel to the axis A of the ring 1, which is the geometric axis perpendicular to the plane of the circular ring 1 and passing through the center of this ring 1, this axis A being considered as the longitudinal axis of the satellite because it is parallel to or in line with the axis of the launcher when the satellite is mounted onto said launcher, each of the walls 5 thus being parallel to an opposite wall 5 and perpendicular to the two walls 5 adjacent to it.

The circular ring 1 is therefore independent of any intermediate support structure and is rigidly and directly linked to the primary walls independently of any intermediate support structure, as is also visible in FIGS. 4a to 4c, 6a, 6c, 9a to 9c, and 10 as described below, and unlike the prior art reviewed above.

In this example embodiment, each of the four walls 5, referred to as primary walls, is attached to the ring 1 by the base 6 of the wall 5, of which a small portion of the surface of the middle rests directly against a small portion of the surface of the upper face of the ring 1, more or less as a point or an area of tangency of the base 6 of this wall 5 with the ring 1, and here the wall 5 is attached to the ring 1 by a single somewhat point-by-point connection, schematically represented as 7. This somewhat point-by-point connection may, for example, be a screw connection, with a single screw, as described below with reference to FIGS. 6b and 6c.

Figure 2B:
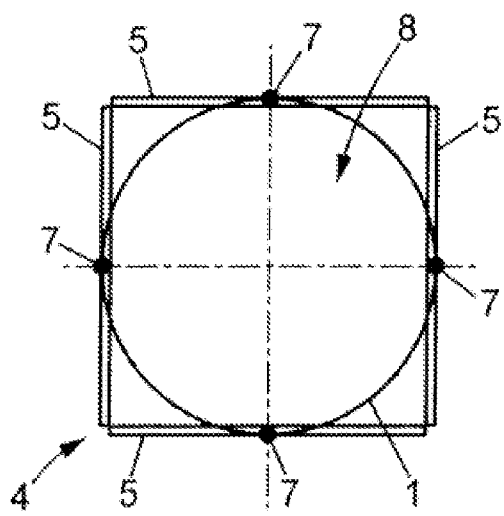

Thus the four somewhat point-by-point connections 7, advantageously identical, appear in FIGS. 2a and 2b as diametrically opposite pairs relative to the axis A of the ring 1, which is parallel to or in line with the longitudinal axis of a compartment 4 having a square cross-section (perpendicular to the axis A).

An equipment-holding platform 8, which is planar and perpendicular to the axis A of the ring 1, is arranged between the bases 6 of the primary walls 5 but without any contact with these walls 5, and this planar platform 8 is rigidly attached so it bears directly on the ring 1, independently of the attachment of the walls 5 to this ring by the somewhat point-by-point connections 7, the attachment of the platform 8 to the ring 1 being assured by advantageously identical attachments, denoted as 9 in the figures, in the four corner areas of the platform 8, which in this example is square in shape. Thus each attachment 9 of the platform 8 to the ring 1 is located between two somewhat point-by-point connections 7 attaching two adjacent walls 5 to the ring 1.

The attachments 9 of the platform 8 to the ring 1 may also be somewhat point-by-point connections, of the same type or of a different type than the somewhat point-by-point connections 7 between the walls 5 and the platform 1, or linear or quasilinear or even slightly arcing connections, and which are each located on one of the arcs of the ring 1 left free by the connections 7 attaching the primary walls 5 to the ring 1, meaning the arcs of the ring 1 which are covered by the corner areas of the platform 8.

Figure 2C:
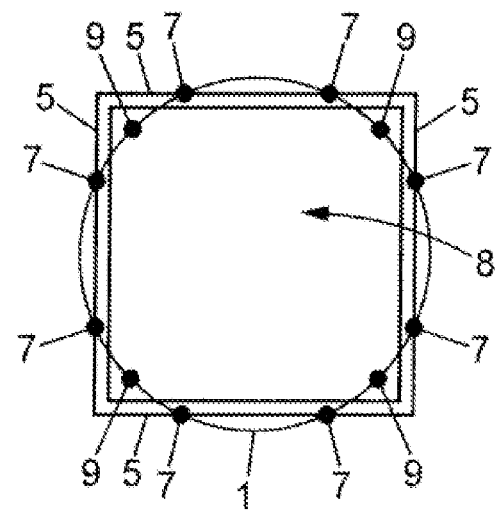
FIG. 2c is a view analogous to FIG. 2b for a variant of the satellite structure of FIGS. 2a and 2b.

As a variant, as represented in FIG. 2c, at least one but preferably each of the four walls 5 of a compartment 4 having a square transverse cross-section slightly smaller than the previous one relative to the same ring 1, can be attached so that its base 6 bears directly on the ring 1 at two points, by positioning this wall 5 so that its base 6 intersects the upper face of the ring 1 at two points or two small surface areas. With the aid of two somewhat point-by-point connections 7, one at each of the two points or intersecting areas, each connection 7 can be physically established in the same manner as the somewhat point-by-point connection 7 of FIGS. 2a and 2b, or in a different manner, with a fitting, a screw, and one or more reinforcements, for example as an insert, on the ring 1 and/or in the wall 5 concerned.

The square platform 8 is directly attached in a planar manner to the ring 1, as in the example in FIGS. 2a and 2b, meaning between the walls 5 and without contact with these walls 5, and independently of the attachment of the walls 5 to the ring 1. The platform 8 is attached to the ring 1 by somewhat point-by-point or linear connections 9, on the arcs of the ring 1 where the corner areas of the platform 8 rest.

The advantages of these embodiments, in addition to the weight and cost savings which result from eliminating the intermediate support structure of the prior art, are that the stresses passing through the walls 5 are exerted at the points of attachment 7 of the walls 5 to the ring 1, which allows simplifying or even eliminating the secondary parts of prior art embodiments, such as angled poles to which the walls are secured and which assume a large portion of the launch stresses on the satellite.

Mechanically, the satellite structure of the invention allows having independent mechanical paths through which are transmitted the stresses between the launcher interface ring 1 and the structural elements of the satellite, including the primary walls 5.

Figure 7:
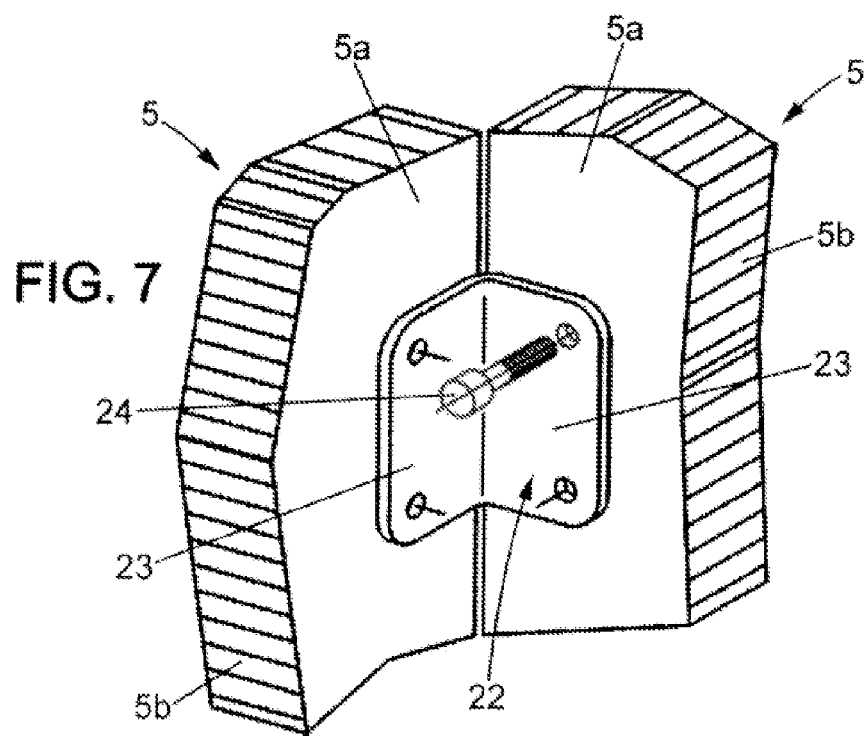
FIG. 7 is a schematic perspective view of an angular lateral connection of two adjacent walls, by an angle bracket.

In the structures of the invention according to FIGS. 2a to 2c, simple angle brackets may be used to attach the walls 5 laterally to each other, as represented schematically in FIG. 7, described below.

Numerous variant embodiments of the structure of the invention are possible, because this structure can come in different sizes according to the diameter of the launcher interface rings 1 which is chosen from among the three possible standard values, and can come in different geometries of prismatic compartments such as 4, having an axis parallel to or in line with the axis A of the ring 1, and having a polygonal cross-section (perpendicular to the axis A of the ring 1) that can preferably be triangular, isosceles trapezoidal, pentagonal, or hexagonal, depending on whether the corresponding compartment 4 consists of three, four, five, or six primary walls, and as respectively represented in FIGS. 3a, 3b, 3c and 3d, in addition to the square polygonal cross-section in FIGS. 2b and 2c, or the rectangular cross-section.

The architecture of the satellite structure of the invention may therefore be adopted for all standard dimensions of the launch interface, and may also be adopted for equipment compartment 4 structures of different cross-sections, such as those represented in FIGS. 2b, 3a, 3b, 3c and 3d in particular, among which the most interesting seem to be the square or hexagonal cross-sections. In FIGS. 3a, 3b, 3c and 3d, as in FIG. 2b, each of the primary walls 5 of the compartments 4 represented in a transverse cross-section is attached to the launcher interface ring 1 by a single somewhat point-by-point connection 7 at the area of tangency of the base of this wall 5 with the ring 1, except for the large base of the isosceles trapezoidal cross-section illustrated in FIG. 3b, for which the corresponding wall 5 is secured to the ring 1 by two somewhat point-by-point connections 7 each located at one of the two points where this large base intersects with the ring 1. But, similarly to the variant in FIG. 2c compared to the embodiment in FIG. 2b for a square transverse cross-section, it is possible in some variants to attach each of the walls 5 to the ring 1 by two somewhat point-by-point connections 7, for compartments 4 having certain of the above polygonal cross-sections, particularly the triangular cross-section.

In FIGS. 3a to 3d, the equipment-holding platform such as the platform 8 in FIGS. 2a to 2c, intended in particular to support a propulsion sub-assembly of the satellite and/or a piloting and orbit and/or attitude control sub-assembly of the satellite, is not represented. However, similarly to FIGS. 2a to 2c, this platform 8 is inserted between the primary walls 5 without pressing against these walls 5, and is secured in a planar manner directly to the ring 1, independently of the individual connections directly attaching the walls 5 to this ring 1.

In these embodiments, however, the equipment-holding platform such as 8 may have a polygonal shape homothetic to the shape of the polygonal transverse cross-section of the prismatic compartment 4 formed by the corresponding walls 5, while being slightly smaller than this polygonal cross-section, to facilitate the placement of the equipment-holding platform between the bases 6 of the walls 5, and this platform 8 is advantageously attached so it bears directly on the interface ring 1 at the supporting areas near the vertices of the corresponding polygonal transverse cross-section, by connections that are also somewhat point-by-point or linear, to arcs of the ring 1 which are covered by said support areas of the platform 8 which are near the vertices of the polygonal transverse cross-section concerned.

FIG. 3e represents a hexagonal variant, with a hexagonal platform 8 placed between the six walls 5 of the corresponding hexagonal compartment 4, and attached in proximity to each of these six vertices by a somewhat point-by-point or linear connection 9 to the ring 1.

Regardless of the number of walls 5 rigidly attached and adjacent two by two to form a compartment 4 for equipment, and therefore regardless of the polygonal shape of the transverse cross-section of the compartment 4, the assembly of the three basic sub-assemblies of the satellite structure of the invention, which are a launcher interface ring 1, a compartment 4 of equipment-holding walls 5, and an equipment-holding platform 8, and more specifically a platform 8 supporting a propulsion device and, preferably in addition, a piloting and orbit and attitude control device for the satellite, is done according to a method comprising three steps schematically represented in FIGS. 4a to 4c, for a compartment 4 having a square cross-section. One of the steps (see FIG. 4a) is to create the compartment 4 from the walls 5, with the ring 1 and the platform 8 being each created and prepared individually and separately. Before, after, or simultaneously with the construction of the compartment 4, the platform 8 is directly attached in a planar manner to the ring 1 (see FIG. 4b), as described above, and then the compartment 4 is directly attached around the platform 8 and without contact with it, by the base 6 of its walls 5 to the ring 1, also as described above, and independently of the attachments of the platform 8 to the ring 1 (see FIG. 4c).

In this structure, the ring 1 and platform 8 secured together form a module that is separable from the rest of the structure (here the compartment 4) by simply disassembling or simply releasing the somewhat point-by-point connections (such as 7) attaching the compartment 4 to the ring 1, for example by unscrewing a limited number of screws. Conversely, this module, previously assembled, prepared, equipped, tested, and certified, can be secured to the rest of the satellite structure, which was separately assembled, prepared, tested, and certified, by screwing in said limited number of screws at said somewhat point-by-point connections to obtain the satellite in its launch configuration.

In addition, before assembling this ring 1/platform 8 module onto the rest of the structure (the compartment 4), the inside of this compartment 4 is accessible through at least its open lower part by at least one operator, for the integration and testing of the equipment intended for this compartment 4, without any other disassembly of any part of the satellite, and in particular without having to open a wall 5 by at least one pivoting panel for example, as is usually done in satellites of the prior art.

The satellite structure architecture of the invention is adaptable to numerous forms and many possible arrangements of the satellite bus with its payload, and FIGS. 5a to 5f represent examples of different structures based on a generic architecture having a square transverse cross-section, it being understood that structures based on a generic architecture having a different polygonal transverse cross-section are also possible, for example those shown in FIGS. 3a to 3d.

Figure 5A:
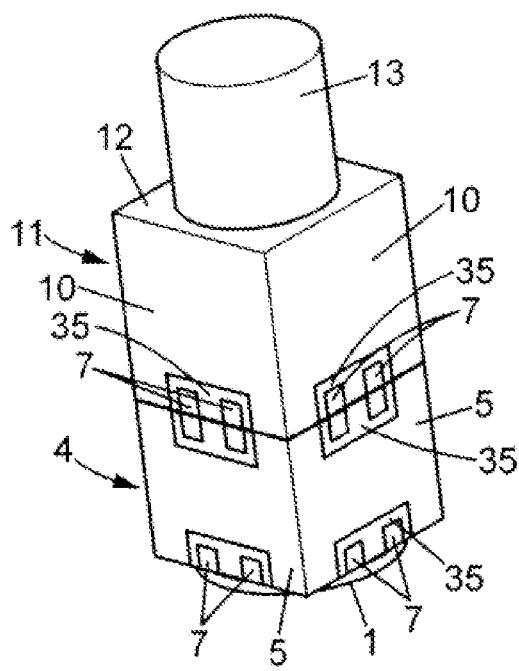
FIGS. 5a to 5f are schematic perspective views of satellites having different structural forms with different configurations in the service systems and payloads according to the invention.

FIG. 5a shows a cubic compartment 4 for equipment, each of the four primary walls 5 being directly secured to the launcher interface ring 1 by two somewhat point-by-point connections 7, as previously described with reference to FIG. 2c, having between the walls 5 a platform such as 8 supporting a propulsion sub-assembly and a piloting and orbit and attitude control sub-assembly for the satellite, this platform being directly attached to the ring 1 independently of the connections 7 and without any contact with the walls 5.

The structure of the satellite also comprises other planar walls 10, of the same shapes, dimensions and structure as the walls 5, and also rigidly secured to each other two by two at their adjacent lateral edges, and each one being additionally attached by its base to an end of one of the respective primary walls 5, this end being on the side of this wall 5 opposite its base 6 and the ring 1. Thus the four square walls 10 assembled perpendicularly two by two above the four walls 5 of the compartment 4 form a second compartment 11, also cubic in shape, and more generally, for any polygonal form of the compartment 4, other walls such as 10 may form another compartment of a prismatic shape having an axis parallel to the axis A of the interface ring 1. This second level compartment 11 mounted atop the first level compartment 4 above the ring 1 may be a payload compartment, while the compartment 4 is a service compartment.

Each of the walls 10 is, in this structure, advantageously attached by its base to the upper end of a wall 5, again by two somewhat point-by-point connections 7, each one vertically aligned with one of the respective two somewhat point-by-point connections 7 attaching the base of the corresponding wall 5 to the ring 1. Thus the paths the stresses follow between the walls 5 and 10, therefore between the compartments 4 and 11, are essentially parallel to the axis of the ring 1.

In addition, in FIG. 5a, the payload compartment 11 is represented as being partially closed off by a platform 12, at its upper end (on the side opposite the service compartment 4), secured to the end of each of the walls 11 on the side opposite its base, preferably also by somewhat point-by-point connections (not represented), so as to stiffen the compartment 11. This platform itself supports an optical instrument 13 such as a space telescope, stellar detector, or other, to supplement the payload carried in the compartment 11, and together with said payload forming a specific payload module above the generic service module defined by the compartment 4, and above a generic satellite orbit and attitude control and piloting and propulsion module formed by the ring 1 and the platform such as 8 (not visible on FIG. 5a) equipped in the above manner.

Figure 5B:
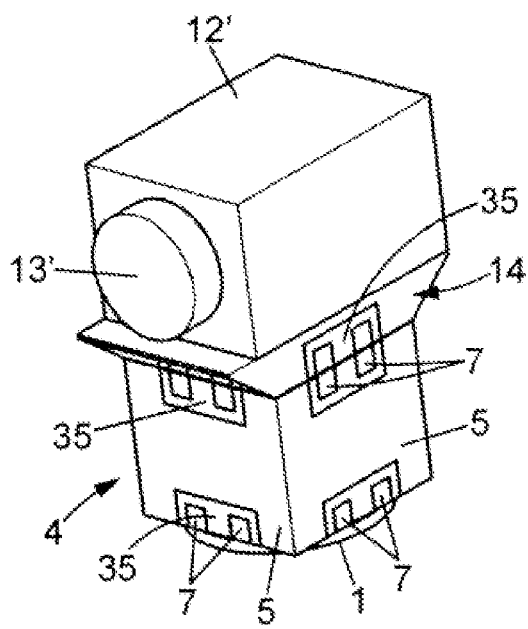

FIG. 5b shows a propulsion module on the ring 1, inside a generic service module comprising the compartment 4 secured to the ring 1, and shows a specific payload module that is different from the one in FIG. 5a because in this case it comprises an optical instrument 13', oriented perpendicularly to the axis of ring 1 and not parallel to the latter as the instrument 13 of FIG. 5a is. The optical instrument 13', for example a telescope, camera for capturing shots of the earth, or other instrument, is supported by a lateral end of a payload compartment 11' in the form of a parallelepiped rectangle solidly secured at its base to a connecting case 14, by somewhat point-by-point connections 7, at each of the four walls 5 of the generic service compartment 4.

Figure 5C:
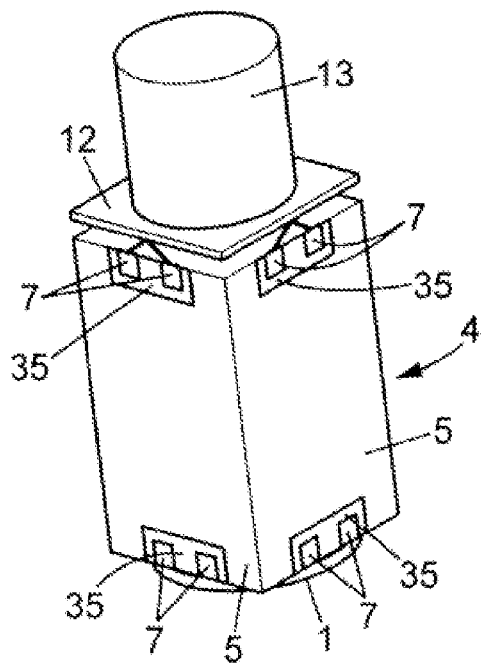

In FIG. 5c, the compartment 4 consists of the assembly of four rectangular primary walls 5, of a length distinctly greater than the width so that the compartment 4 has the shape of an elongated rectangular parallelepiped, attached to the ring 1 by a small end face, the large sides of the walls 5 being oriented parallel to the axis of the ring 1. The satellite thus presents a structure of significant and adapted length or height, with in this example the compartment 4 supporting an optical payload 13 analogous to the one in FIG. 5a, on an upper platform 12 supported at the upper end of each of the four walls 4 with two somewhat point-by-point connections 7, schematically represented, and each one again vertically aligned with their respective one of the two somewhat point-by-point connections 7 attaching the base of the corresponding wall 5 to the ring 1.

Figure 5D:
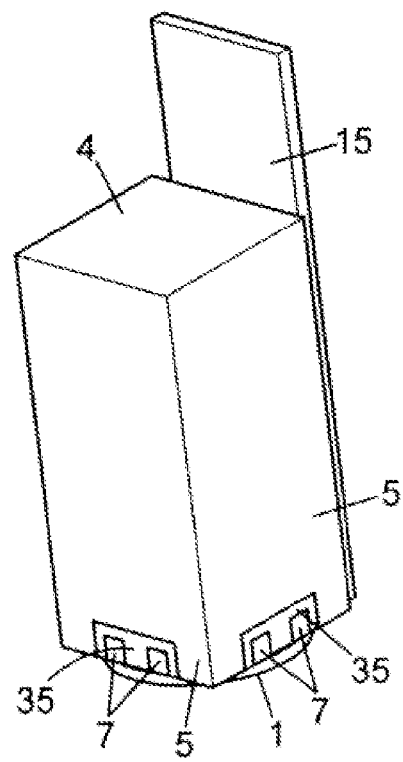

In FIG. 5d, the structure of the satellite is also elongated parallel to the axis of the ring 1, and its service compartment 4, in the shape of a rectangular parallelepiped attached by a small face to the ring 1, supports a payload consisting of some type of radar instrument 15 on the outer face of one of its rectangular side walls 5. In this case, as with the one in FIG. 5c, the satellite structure is advantageous because the stresses are still essentially transmitted parallel to the axis of ring 1 and to the walls 5.

Figure 5E:
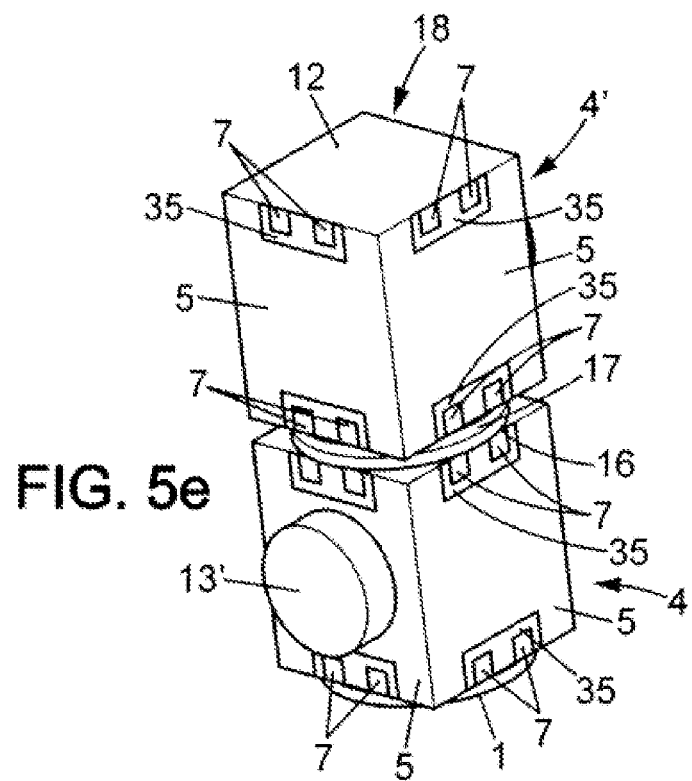

The architecture of the structure of the invention also allows the launch of multiple stacked satellites, using interface rings of the same type as the launcher interface rings 1. An example of such an embodiment is represented in FIG. 5*e*. Here one can see a base compartment 4 in which each of the four walls 5 is attached by its base to the ring 1 using two somewhat point-by-point connections 7, one of the walls 5 carrying an optical instrument 13' as payload, projecting from its outer face. In addition, each of the walls 5 is also attached by two somewhat point-by-point connections 7, at its end facing away from the launcher interface ring 1, directly under a circular satellite interface ring 16 which in this example is of the same diameter as the launcher interface ring 1. The ring 16 is itself removably secured to a second satellite interface ring 17 that is part of a second satellite having a structure, in this example, analogous to that of the satellite comprising the compartment 4 and the ring 1. The second satellite 18 also comprises a propulsion and piloting and orbit and attitude control module, not represented in FIG. 5*e* except by its ring 17 which directly supports a platform supporting the propulsion sub-assembly and the piloting and orbit and attitude control sub-assembly, inside the four primary walls 5 of a cubic compartment 4' of the satellite 18, analogous to the compartment 4 previously described, and of which each of the walls 5 is directly attached to the satellite interface ring 17 by two somewhat point-by-point connections 7, independently of the analogous or linear connections between this ring 17 and the abovementioned inner platform. The latter platform is without any contact with these walls 5, each wall also being attached at its upper end by two other somewhat point-by-point connections 7, on the side opposite the ring 17, to an upper platform such as 12, to stiffen and enclose the compartment 4'. The connections 7 of each wall 5 of the compartment 4' to this platform 12 are each vertically aligned with a respective one of the two analogous connections 7 between this wall 5 and the satellite interface ring 17, which in turn are each also vertically aligned with a respective one of the two analogous connections 7 of a corresponding wall 5 of the compartment 4 to the satellite interface ring 16, as well as to the respective one of the two connections 7 between the base of this same wall 5 of the compartment 4 and the launcher interface ring 1, still in order to transmit stresses in a direction substantially parallel to the common axis of the interface rings 1, 16 and 17, and in line with the walls 5 of the two superimposed compartments 4 and 4' of the two satellites stacked for a group launch.

In such a structure, the two satellite interface rings 16 and 17 are necessarily of the same diameter, to enable them to be secured to each other during a group launch. Once the two secured satellites are together released from their common launcher by the separation between the launcher interface ring 1 and the analogous ring on the upper end of the launcher, they are then detached from each other to allow the individual release of each satellite. In another embodiment of the release sequence compatible with the proposed structure, the upper satellite 18 is first released by ordering the separation of the satellite interface rings 16 and 17, then the remaining satellite is in turn released by the separation of the launcher interface ring 1 and the analogous ring on the launcher.

Figure 5F:
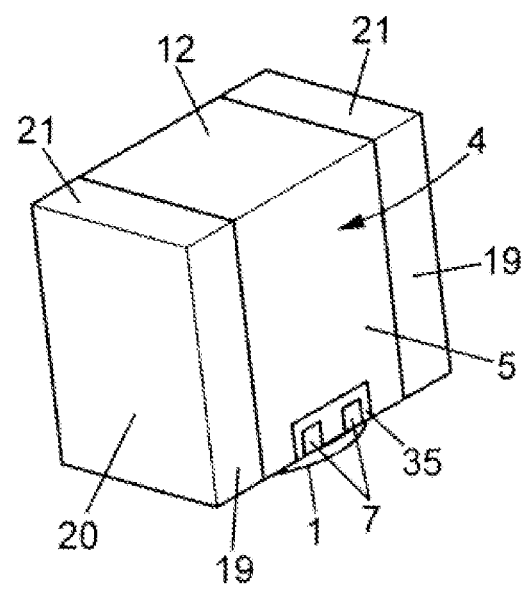

The structure interface according to the invention also allows the implementation of specific structures, of which an example is represented in FIG. 5*f*, from a base module comprising the launcher interface ring 1 to which are directly attached, by their base and somewhat point-by-point connections 7, the four walls 5 (of which only one is visible in FIG. 5*f*) of a rectangular parallelepiped compartment 4, to which are attached other planar walls, referred to as secondary walls. Some of these secondary walls 19 are attached on each side, parallel to and as a lateral extension of two opposing primary walls 5, others of these planar secondary walls 20 are attached parallel to the two other opposing primary walls 5 and perpendicular to the secondary walls 19, while other secondary walls 21 are perpendicular to the primary walls 5 and to the secondary walls 19 and 20, as well as to the axis of the ring 1, and are lateral extensions to each side of an upper platform 12 that closes off the compartment 4. These secondary walls 19, 20 and 21 are rigidly secured to each other and/or to the primary walls 5 so as to form new compartments and increase the surface area and volume available for housing equipment. In the specific example in FIG. 5*f*, two additional compartments in the shape of a rectangular parallelepiped are arranged on each side of the central compartment 4. The rigid attachment of secondary walls 19, 20 and 21 to each other and/or to the primary walls 5 can be ensured in the same manner as the rigid attachment of two primary walls 5 to each other, at the adjacent lateral edges of two primary 5 and/or secondary walls 19, 20, 21, using an angle bracket 22 for example, as represented in FIG. 7. Each of two legs 23 of said angle bracket is screwed into the respective one of the two walls 5 that this angle bracket 22 is joining together, by two screws 24 screwed into the inside face of the respective one of the two walls 5.

The primary walls 5, like the secondary walls 19, 20 and 21, are planar walls, each one preferably and in a well-known manner constructed of a panel having a honeycomb structure with skins 5*a* of aluminum or aluminum alloy, and the honeycomb core part 5*b* that is a composite or is also of aluminum or aluminum alloy, due to the light weight and good heat conductivity of aluminum and its alloys. To guide the screws 24 and prevent deterioration of the panels that form the walls 5, 19, 20 and 21, at their angle bracket 22 attachments, the corresponding panels may have metal inserts (not represented in FIG. 7) at the edge areas where the angle brackets 22 are attached, integrated into the corresponding edges of the panels so as to be flush with their inner face.

In all the satellite structures of the invention, and as described above, it may be advantageous to have primary walls 5 and/or secondary walls 19, 20 and 21 that are not removable, which decreases the number of secondary parts or connecting parts such as angle brackets 22, the number of assembly operations, as well as the constraints related to the removability of screwed connections between walls. Secondary parts, such as interfaces between equipment to be attached to walls and these primary walls 5 or secondary walls 19, 20 and 21, may serve to reinforce the connections between walls, for example equipment supports mounted in the corners or dihedrals formed between two or three walls or between walls and a platform.

Figure 6A:
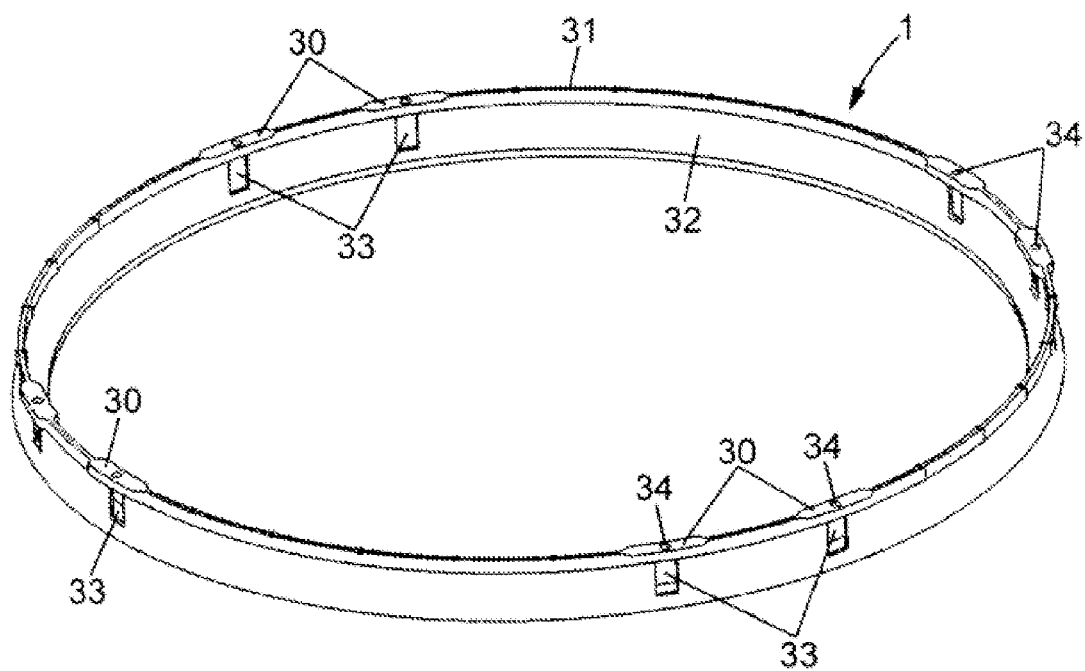
FIGS. 6a, 6b and 6c are perspective views respectively showing an example launcher interface ring and an example fitting for the somewhat point-by-point connection between the interface ring and a primary wall, and details of the attachment of the primary wall to the ring by two somewhat point-by-point connections.
Figure 6B:
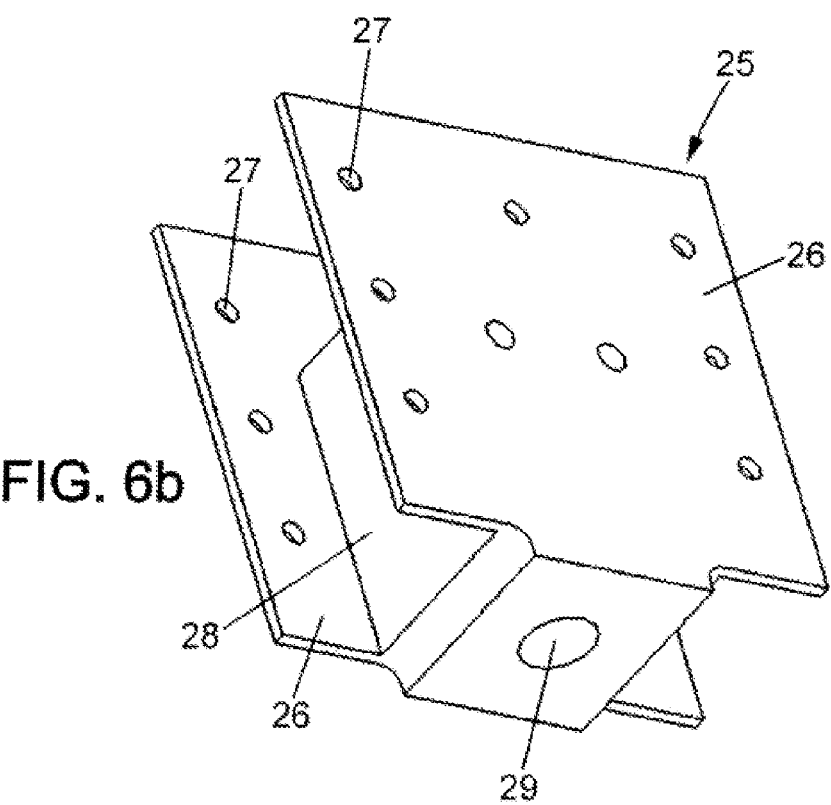
Figure 6C:
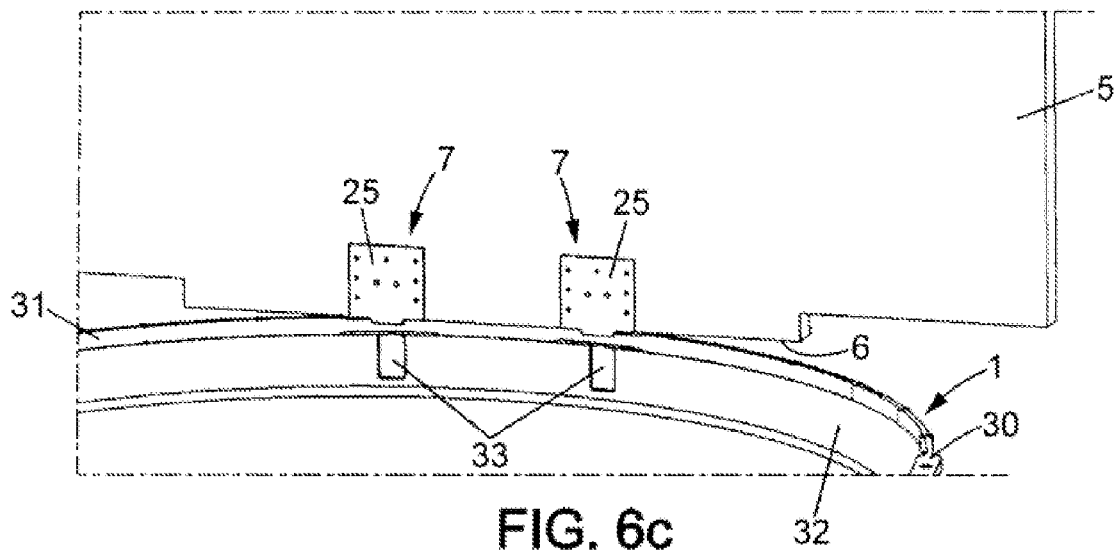

Inserts to reinforce panel edges are advantageously integrated into the portions of the base and/or the edge of the end opposite this base and at the locations where walls such as 5 and 10 are attached by somewhat point-by-point connections 7 to the ring 1 or to each other or to platforms such as 12, to stiffen the structure and/or support the payload, because, advantageously, the somewhat point-by-point connections 7, or at least some of them, may be in the form of a mechanical screw connection, comprising at least one reinforcing fitting for connecting a primary wall 5 to the ring 1, as described herein in the example with reference to FIGS. 6a to 6c.

FIG. 6b represents a fitting 25 which can be used as an insert to establish a somewhat point-by-point connection 7. Here it has a clevis arrangement with two parallel arms 26, each arm of a same rectangular shape and intended to accept the base 6 of a primary wall 5 between them and retain it with seven screws (not represented), each screw screwed through two coaxial holes 27 facing one another in the two arms 26, perpendicular to these arms 26 and screwed through the part of the base of the wall 5 held between the arms 26, and also perpendicular to the axis of the interface ring 1 when the clevis 25 is screwed into its attachment position on the ring 1 of FIG. 6a. For this purpose, the two arms 26 project upwards from a clevis base 28 pierced by a borehole 29 substantially parallel to the axis A of the ring 1 when the clevis 25 is in position on said ring, to allow the passage of a screw (not represented) to attach the clevis 25 to the ring 1, on a flat tongue 30 perpendicular to the axis A of the ring 1 and projecting radially outwards and inwards from the ring 1, on the upper edge 31 of a cylindrical web 32 of circular cross-section of the ring 1, and at a right angle to an opening 33 substantially rectangular in shape that is arranged in the web 32 and is of sufficient size to allow accommodating and manipulating a nut (not represented) which is screwed onto the lower end of the threaded rod of the screw passing through the borehole 29 in the clevis base 28 and a corresponding opening 34 arranged in the tongue 30 of the ring 1, for rigidly attaching the clevis 25 to the ring 1. The clevis 25 mates with an indentation of a shape corresponding to that of the base of the clevis 28, arranged in the base 6 of a wall 5 at the location of a somewhat point-by-point connection 7, such that the arms 26 straddle the indentation in the wall 5 on the two sides and at the center of the wall 5, parallel to the axis A of the ring, when the wall 5 is attached to said ring. This establishes a somewhat point-by-point connection 7 attaching the base 6 of a primary wall 5 to the ring 1, as represented in FIG. 6c, which corresponds to an attachment of a wall 5 to the ring 1 by two somewhat point-by-point connections 7, due to the base of this wall 5 intersecting the ring 1 at two "points" or small areas of contact, at the two successive tongues 30 on the ring 1, as schematically represented in FIG. 2c by the two somewhat point-by-point connections 7 between one wall 5 and the ring 1. The same clevis 25 may be used to attach the base of walls 5 to a satellite interface ring 17, in the embodiment of FIG. 5e, or as an insert in an inverted position with its arms 26 projecting downwards in order to straddle an indentation in the upper edge of a wall 5 and attach it to the other satellite interface ring 16, in this same embodiment.

For an implementation of somewhat point-by-point connections 7 between a primary wall 5 secured directly to the launcher interface ring 1 and another wall 10 (see FIG. 5a) which is assembled as an extension of said wall 5, in the direction of the axis A of the ring 1, an example embodiment is represented in FIGS. 8a and 8b.

In these FIGS. 8a and 8b, the undoable somewhat point-by-point connection, intended to ensure the interface between two walls 5 and 10 in the direction of the axis A of the ring 1, comprises two attachment fittings, each in a clevis arrangement 36 or 37 with two rectangular arms that are parallel and spaced apart 38 or 39, pierced with opposing holes in the two arms of the same clevis to accommodate screws for attachment to a respective wall. The two arms 38 or 39 project in the same direction from a clevis base 40 or 41. The two devises 36 and 37 are intended to be placed head to tail, one above the other and their bases 40 and 41 facing each other, so that the two clevis bases 40 and 41 can be fastened together by a screw 40a screwed through a transverse opening 40b traversing the clevis base 40, and able to engage axially with aligned boreholes 42 and 43 in said clevis bases 40 and 41, borehole 42 being smooth and borehole 43 being threaded, so that the screw 40a is screwed into borehole 43. Each clevis 36 or 37 mates with an indentation of a shape corresponding to that of the clevis base 38 or 39, said indentation being arranged in the base of the upper wall 10 or the upper edge of the lower wall 5. Thus the upper clevis 36 has two arms 38 intended to straddle the indentation in the base of a wall such as 10 in FIG. 5a, this clevis 36 being fastened to the base by screws (not represented) passing through the pairs of aligned holes 44 arranged in the two arms 38 of this clevis 36, while the lower clevis 37 straddles with its two arms 39 the indentation in the upper edge of a wall such as 5 in FIG. 5a, to which the clevis 37 is secured by screws through the pairs of aligned holes 45 arranged in the two arms 39 of this clevis 37. After assembly, the screws attaching the two clevises 36 and 37 to their respective wall 10 or 5 are substantially perpendicular to the axis A of the ring 1, to which the screw 40a connecting the two clevises 36 and 37 is substantially parallel.

Figure 9A:
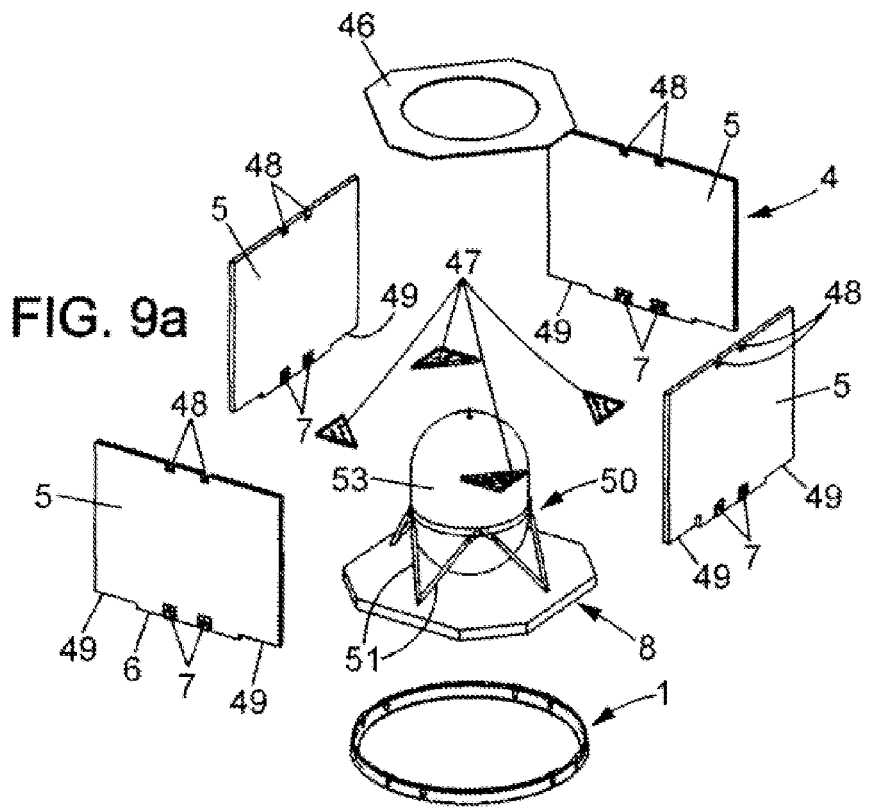
Figure 9B:
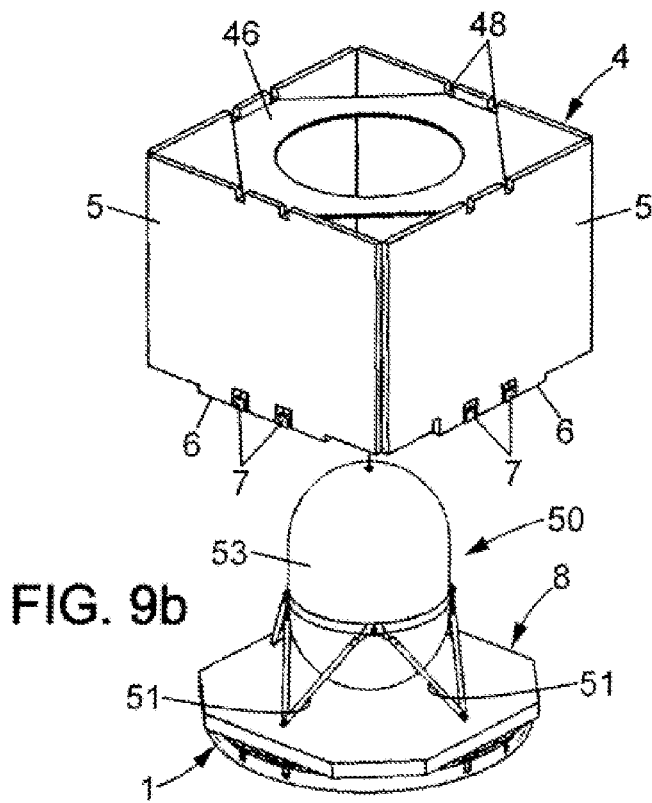

FIGS. 9a to 9c schematically represent three successive steps of the method for implementing a satellite of the invention, to supplement the above description of the assembly method of FIGS. 4a to 4c. In actuality, FIG. 9a corresponds to two independent steps, which may or may not be simultaneous, in the implementation of the satellite.

The first step, illustrated in the upper and peripheral portion in FIG. 9a, is the assembly of a substantially cubic compartment 4 from the following elements:

four primary walls 5, an upper annular platform 46, its perimeter being that of a square with its four corners cut off to form an irregular octagon with four large sides alternating with four small sides, said platform having a circular central opening, four angle brackets 47, each one intended to rigidly connect the lower adjacent corners of two neighboring walls 5, a set of assembly screws and fittings (not represented) comprising corner fittings for rigidly connecting the walls 5 two by two along two vertical adjacent edges, and also for attaching each angle bracket 47 to the two lower sides having a corresponding indentation 49 in the base of the two walls 5 that each bracket 47 fastens together, and also for attaching the upper edge of each wall 5 to a small side of the octagonal perimeter of the upper platform 46, using two somewhat point-by-point connections such as 7, previously described, by means of fittings (not represented) inserted into two indentations 48 arranged in the upper edge of each wall 5, in order to obtain the compartment 4 shown in the upper portion of FIG. 9b, stiffened at the four corners of its base by the brackets 47 and at the upper edges of the walls 5 by the upper platform 46.

The other step, represented in the lower and center part of FIG. 9a, corresponds to assembling a propulsion sub-assembly 50, supported by feet 51, onto the platform 8. The thrusters 52 (see FIG. 9c) of the propulsion sub-assembly 50 project beneath this platform (see FIG. 9c). In this example, the platform 8 is a square platform with its four corners cut off so that its perimeter also resembles an irregular octagon with four large sides alternating with four small sides, the platform 8 being attached in proximity to each of said sides so as to bear directly on the launcher interface ring 1 by a linear connection to an arc of the ring 1 covered by this small side of the platform 8, assembled as represented in the lower part of FIG. 9b. As a variant, the region of each small side of the platform 8 can be linked directly to the ring 1 by two somewhat point-by-point connections such as 7 which allow connecting each base 6 of each wall 5 to the ring 1, at the two inserts 25 of this base, during the assembly of the compartment 4 of the upper part of FIG. 9b to the propulsion module of the lower part of this FIG. 9b, where this module comprises the ring 1, the platform 8, and the propulsion sub-assembly 50.

Advantageously, this propulsion module may be supplemented by an piloting and orbit and attitude control sub-assembly for the satellite, which comprises for example four reaction wheels 56 mounted on the platform 8 at each of the four small sides of the said platform.

Using this "parallel" (independent) assembly of the propulsion module, with the ring 1, platform 8, and propulsion sub-assembly 50 supported by this platform 8, and the rest of the satellite supported by the walls 5 of the compartment 4, vibration or thermal testing of the satellite can be done without a propulsion module being mounted on the compartment 4. Similarly, the launch campaign can be carried out without the propulsion module, prior to coupling said module onto the compartment 4 mounted on the launcher.

Preparing the propulsion module independently of the rest of the satellite allows filling the tank(s) 53 of the propulsion sub-assembly 50 at the propellant supplier, which eliminates risks related to the transfer of propellant, as some propellants such as hydrazine are particularly hazardous. After filling the tank(s) 53 of the propulsion sub-assembly 50 with propellant, the fueled propulsion module is transported and is then stored apart from the rest of the satellite which comprises the compartment 4 and the equipment it contains, possibly with an additional payload compartment and/or a payload mounted on the compartment 4 and the upper platform 46. Once integrated, the propulsion module closes up the satellite by the attachment of the walls 5 of the compartment 4 to the ring 1, yielding a satellite ready for launch.

If a problem with the satellite arises, it is reopened with no disassembly other than removing the screws from the eight somewhat point-by-point connections 7 attaching the bases of the four walls 5 of the compartment 4 to the ring 1, to separate the propulsion module from the rest of the satellite, still without any transfer of propellant and therefore with no risk-taking near the satellite. If necessary, it is then possible to empty the tank 53 of propellant or at least one of the multiple tanks of propellant on the propulsion module, at a distance from the rest of the satellite.

Figure 12A:
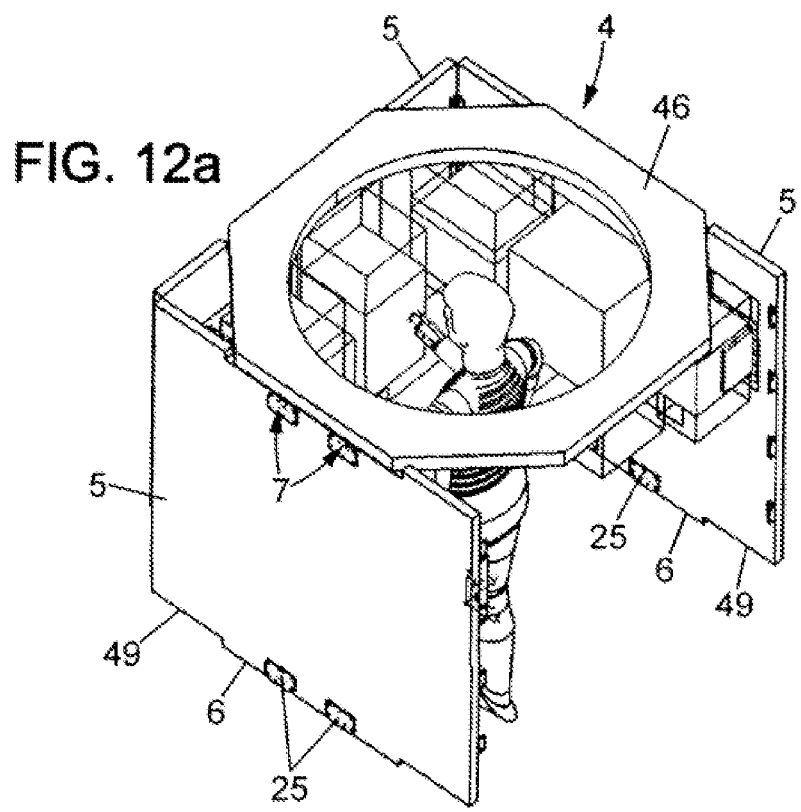
FIGS. 12a and 12b schematically represent two positions of a compartment opened at its base to allow the integration of equipment into the compartment.
Figure 12B:
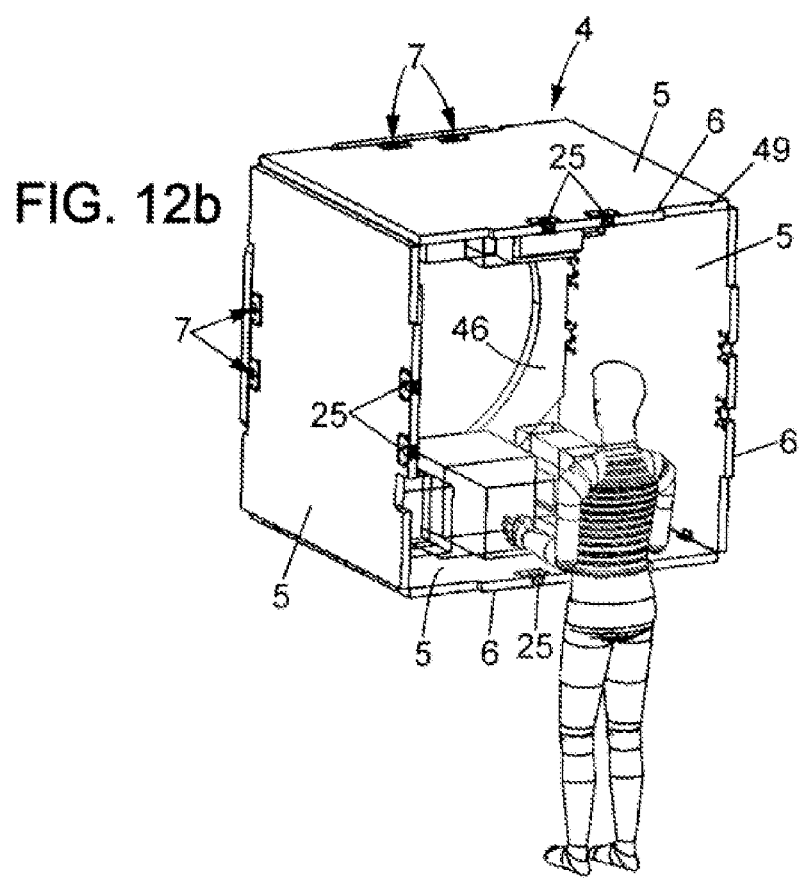

Before the assembly of the propulsion module, separately assembled, mounted on the platform 8, filled with propellant, tested then certified, as represented in the lower part of FIG. 9b, onto the compartment 4 as assembled in the upper part of FIG. 9b, it is possible to add all the necessary equipment to the compartment 4 without disassembling any wall 5 or component panel of a wall 5, due to the opening in the base of the compartment 4, as is represented in FIGS. 12a and 12b.

In FIG. 12a, the compartment 4 (one wall 5 not being represented for clarity) of the satellite is maintained vertically by lifting means not represented, so that an operator can stand inside the compartment 4, accessible through its open base, and can thus perform the complete integration of the necessary equipment into the compartment 4. As a variant, as represented in FIG. 12b, the compartment 4 may be tilted onto a side, consisting of a wall 5, on a support or by lifting means not represented, so that an operator standing next to the compartment 4 can access the inside through the open base of the compartment 4, or through the central opening in the upper stiffening platform 46, in order to integrate the equipment with this compartment 4.

FIG. 10 represents an exploded perspective view of a satellite having a structure substantially corresponding to the structure of FIG. 5a, without an optical payload 13 above a payload compartment 1 assembled and mounted as a second level above a service compartment 4 assembled and mounted as the first level above the launcher interface ring 1 of a propulsion module separately and previously assembled, tested, and certified as explained above.

In this example, the propulsion module 54 is of a type in which the platform 8 secured directly to the ring 1 supports not only a propulsion module 50, as previously described, with a tank of propellant 53 that is cylindro-spherical in shape (its outline being a cylindrical body having a circular cross-section, between two hemispheres), with thrusters 52 projecting under the platform 8, but also a piloting and orbit and attitude control sub-assembly 55, of which only three reaction wheels 56 can be seen, mounted substantially along the three small sides of the octagonal platform 8 as described with reference to FIGS. 9a and 9c. The payload compartment 11 and the service compartment 4 can each be independently equipped with the equipment it is intended to accept, in order to create a payload module 57 and a service module 58 respectively. These two modules 57 and 58, as well as the propulsion module 54, can be integrated and tested separately, and the couplings are reduced to eight unfitted screws between two adjacent modules, because each of the walls 5 of the compartment 4 is attached to the ring 1 by two somewhat point-by-point connections 7, their fittings 25 visible in FIG. 10, and because each of the walls 10 of the payload compartment 11 is attached by its base to the upper edge of a corresponding wall 5 of the service compartment 4 by two analogous somewhat point-by-point connections.

Thus the service module 58 is directly supported on the launcher interface ring 1, and does not interfere with the platform 8 of the propulsion module 54, and the payload module 57 is directly supported on the service module 58.

Figure 11:
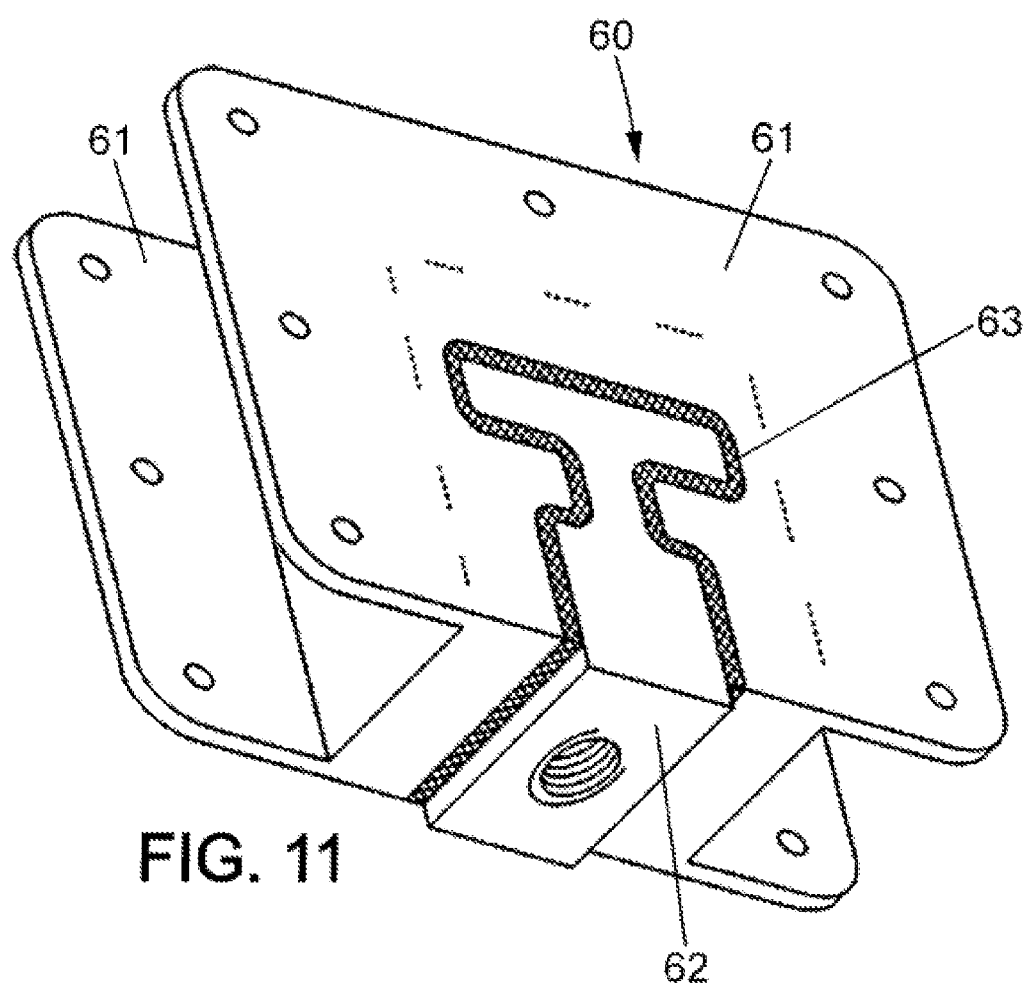
FIG. 11 is a perspective view of an example of a shock and vibration damper or isolator, usable for connecting a primary wall to the launcher interface ring, in a satellite of the invention.

As a variant, to ensure that the walls 5 of the servitude module 58 are isolated from the propulsion module 54 for shocks and impacts originating from the launcher before the satellite is released, and for vibrations originating from the propulsion module 54 or piloting module 55 after the satellite is released, the connection between each of the walls 5 of the compartment 4 and the ring 1 can be achieved by means of at least one shock and/or vibration isolator, as represented for example in FIG. 11, which may be integrated or associated with a somewhat point-by-point connection.

For this purpose, the shock and vibration isolator or damper 60 of FIG. 11 is analogous to an insert clevis 25 and comprises two arms 61 analogous to the arms 26 of the clevis 25, intended to be attached to an indentation in the base 6 of a wall of a compartment such as 4, and a clevis base 62 analogous to the clevis base 28 and intended to receive an axial screw (substantially parallel to the axis of the ring 1) of the one or two somewhat point-by-point connections 7, and a layer of a viscoelastic elastomeric material 63 is inserted between the two arms 61 and the clevis base 62 to serve to isolate and cushion shocks and vibrations.

Thus, isolators or dampers 60 can be placed between the propulsion module 54 and the service module 58 to filter out microvibrations during flight and/or cushion against shocks during launch.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention. Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A satellite having a structure comprising:
a circular launcher interface ring intended to be removably secured to an analogous ring secured to a satellite launcher, and
at least two planar equipment-holding primary walls extending substantially parallel to a longitudinal satellite axis of said circular launcher interface ring and rigidly connected to each other and to said circular launcher interface ring,
wherein each primary wall bears directly on an upper face of said circular launcher interface ring by a base of said primary wall, said base facing said circular launcher interface ring, and each primary wall is rigidly and directly attached to said circular launcher interface ring by at least one somewhat point-by-point connection to at least one point or area of tangency or of intersection between said base of said primary wall and said circular launcher interface ring.

2. The satellite according to claim 1, said structure comprises at least three planar primary walls, rigidly attached and adjacent two by two to form a prismatic compartment having an axis substantially parallel to said axis of said circular launcher interface ring and having a cross-section, perpendicular to axis of said circular launcher interface ring that is polygonal.

3. The satellite according to claim 1, wherein said structure also comprises an equipment-holding platform arranged between said primary walls but without any contact with said primary walls, and directly bearing on said circular launcher interface ring to which said equipment holding platform is rigidly and directly attached so as to be planar, independently of attachments of said primary walls to said circular launcher interface ring.

4. The satellite according to claim 3, wherein said equipment-holding platform is attached to said circular launcher interface ring by connections that are also somewhat point-by-point or linear, on arcs of said circular launcher interface ring left free by said attachments between said primary walls and said circular launcher interface ring.

5. The satellite according to claim 3, wherein said equipment-holding platform supports at least one propulsion sub-assembly and a sub-assembly for piloting and orbit and attitude control of the satellite.

6. The satellite according to claim1, said structure also comprises planar secondary walls, substantially parallel or perpendicular to said primary walls, rigidly attached to at least one of other secondary walls and primary walls to form new compartments and increase the surface area and volume available to house equipment.

7. The satellite according to claim 1, wherein said structure also comprises additional planar walls, substantially parallel to said axis of said circular launcher interface ring, rigidly attached to each other and each of said additional walls being attached by a base to an end of one of said primary walls, said end facing away from said circular launcher interface ring, such that said additional walls form a compartment, having an axis parallel to said axis of said circular launcher interface ring, and said additional walls being attached by somewhat point-by-point connections above said primary walls.

8. The satellite according to claim 1, wherein an end of said primary walls which faces away from said circular launcher interface ring is attached directly, by at least one somewhat point-by-point connection per primary wall, to a circular satellite interface ring, wherein is intended to be removably secured to a second satellite interface ring of another satellite stackable onto said satellite for a group launch.

9. The satellite according to claim 1, wherein at least one somewhat point-by-point connection attaching said circular launcher interface ring, to a primary wall or to a platform being at least one of an equipment holding, stiffening and payload support platform, comprises or is at least associated with a shock and vibration isolator.

10. The satellite according to claim 3, wherein an assembly consisting of said equipment-holding platform attached to said circular launcher interface ring, forms a module that can be removed without disassembling any other part of the satellite, the disassembly of said assembly making it possible to open up the satellite to perform actions inside.

11. The satellite according to claim 8, wherein said satellite interface ring is of the same diameter as said circular launcher interface ring.

12. The satellite according to claim 8, wherein at least one somewhat point-by-point connection attaching said satellite interface ring to a primary wall comprises or is at least associated with a shock and vibration isolator.

* * * * *